Jan. 31, 1956     F. C. SCHWANEKE     2,732,580
HINGE FOR COOKING DEVICE

Original Filed April 7, 1951     2 Sheets-Sheet 1

Inventor:
Fred C. Schwaneke
By: Watson D. Harbaugh
atty'.

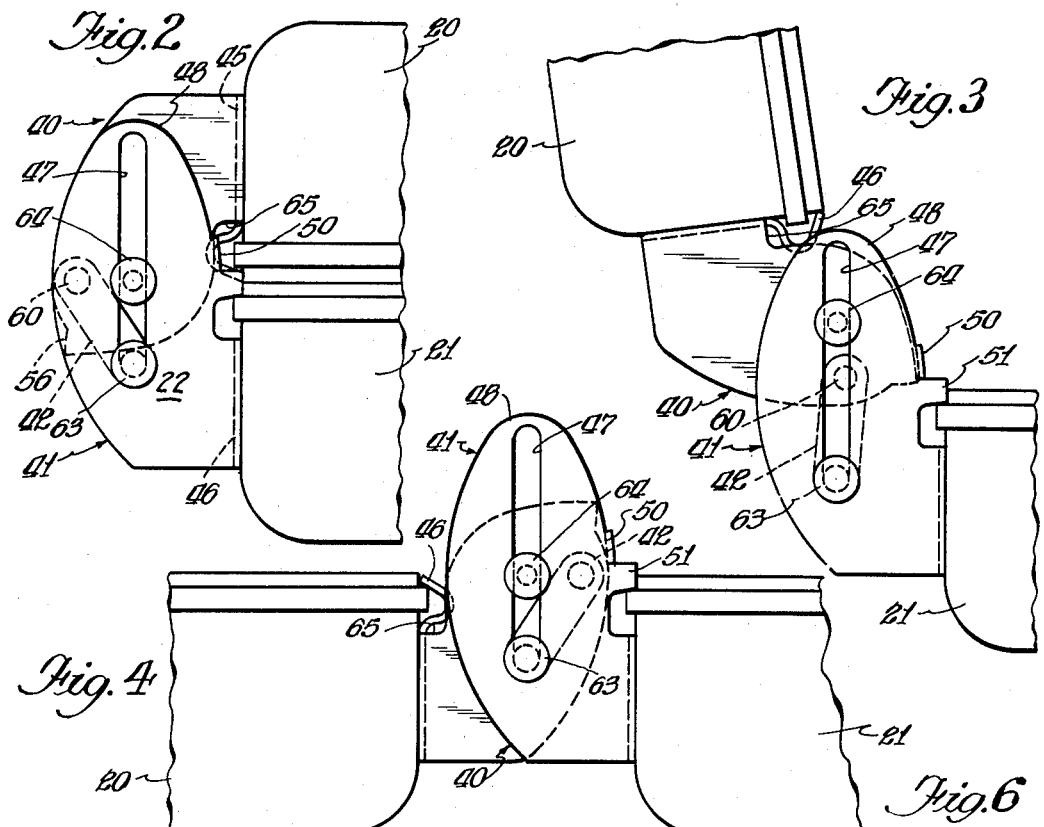
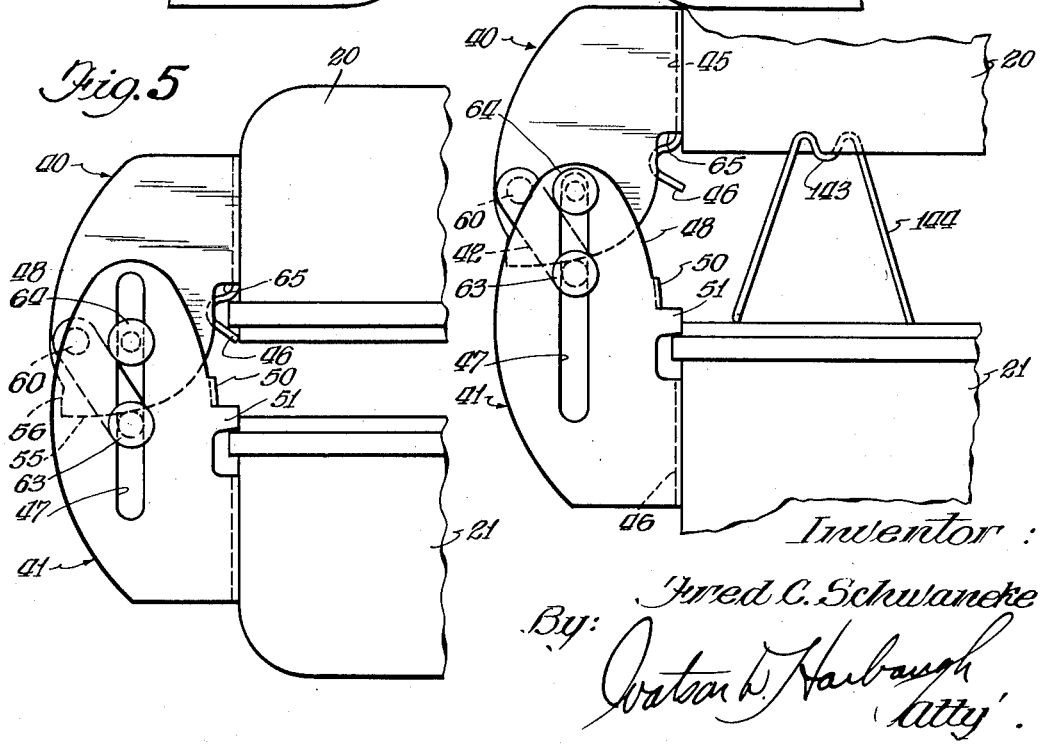

United States Patent Office 2,732,580
Patented Jan. 31, 1956

2,732,580
HINGE FOR COOKING DEVICE

Fred C. Schwaneke, Chicago, Ill., assignor to Dormeyer Corporation, Chicago, Ill., a corporation of Illinois Original application April 7, 1951, Serial No. 219,796. Divided and this application November 1, 1952, Serial No. 318,469

4 Claims. (Cl. 16—166)

The present invention relates to a hinge construction for a cooking device or the like for making waffles, grilling sandwiches and broiling steaks and this application is a division of application Serial No. 219,796, filed April 7, 1951.

One of the objects of the invention is to provide an electrical cooking device having hinged parts which will accommodate food requiring a different spacing between two cooperating cooking elements over a wide range and will permit the positioning of the elements in any one of three different positions angularly with respect to each other for baking, grilling and broiling various foods with equal facility and with little if any inconvenience to the user in doing these various operations in succession.

Another object of the invention is to provide a three-position hinge in which one of the hinge members is shifted bodily while maintaining its limits of movement in both directions with respect to the other hnge member.

Another object of the invention is to provide an improved hinge which automatically lifts the upper member and is limited to move between two predetermined positions when tilted unless moved in a secondary direction, yet will permit any degree of separation between the parts supported by it when in its closed position.

The invention is also characterized by an improved hinge construction, the axis of pivoted movement of which is positively displaced upwardly as the hinge is opened, so that grids of a waffle baker move bodily away from each other as well as pivotally with respect to each other.

A further object of the invention is to provide a device of the class described which is easy to operate, simple and inexpensive to manufacture and maintain yet rugged enough to withstand abuse and lack of care.

These being among the objects of the invention other and further objects will appear from the drawings, the description relating thereto and the appended claims.

Referring now to the drawings:

Fig. 2 is an enlarged elevational view of the hinge embodied in the invention when the top and lower units are in closed position;

Fig. 3 is a fragmentary enlarged view of the hinge with the top unit disposed in a raised position;

Fig. 4 is a view similar to Fig. 2 with the top and lower units disposed wide open at 180° from their closed position;

Fig. 5 is a view similar to Fig. 2 with the top and lower units disposed in closed but spaced relationship to grill a sandwich;

Fig. 6 is a view similar to Fig. 2 with the top and lower units disposed in closed but widely spaced relation to broil steaks.

Figure 1:
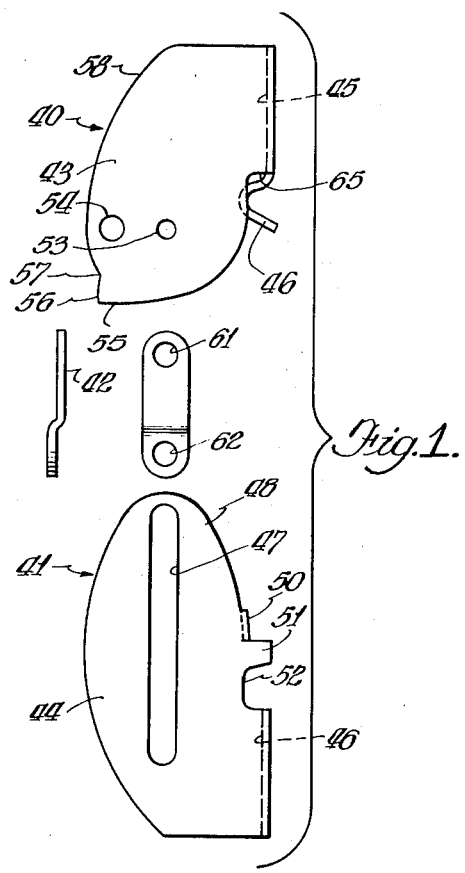
Fig. 1 is a view of the parts making up the hinge embodied in a combination waffle, grill and broiler cooking device.

The invention is characterized by a novel hinge construction and arrangement enabling the upper grill member to grill, bake and broil in a device which operates also as a waffle baker upon occasion.

In one instance, the hinge enables the upper and lower units to cooperate as a waffle maker. In this relationship the upper grill is limited in its pivoted movement to approximately 100° from horizontal to 10° past vertical for access in applying the batter and removing the waffle. Reversal of the grill plates permits the device to serve as a sandwich grill.

When one desires to use the device as a hot plate, the upper member is raised to its upper limit and lifted a small fraction of an inch to clear the hinge stops whereupon the upper member can be moved further and laid flat to occupy the same plane as that of the lower member. In this position the upper element can also be used as a hot plate either with the grid element present or removed.

For broiling meats or toasting bread the grid on the upper member is removed and a novel wire rack is placed upon the lower grid to carry the meat or bread slices. The hinge construction enables upstanding loops on the wire rack to engage the upper housing when it is lowered and support it well above the food as accommodated by the hinge.

Referring to the drawings in further detail a cooking device is partially shown which has upper and lower die stamped housings or shells, 20 and 21, respectively, hinged together by a hinge represented generally at 22.

The hinge 22 comprises two main units (Fig. 1), an upper unit 40 and a lower unit 41, two connecting links 42 and pins as hereinafter described. Both units are preferably made of heavy sheet metal and stamped to have two symmetrically arranged end portions shaped as shown at 43 and 44, which end portions are connected by band portions 45 and 46, respectively. The units are secured to the respective top and bottom housings 20 and 21 along their band portions by being riveted to the back sidewall of the respective shells. It is preferred that adjacent edges of the two bands be flush or coincide with the adjacent edges of the two shells. Two frontwardly opening hook-like ears 46 are struck from the upper band 45 to extend below the lower edge of the upper shell 20 as more particularly seen in Fig. 5 where it serves to locate and secure the waffle plate as later described.

The lower end sections 44 have a long vertical slot 47 centrally therein and two ears on its front edge 48. The upper ear 50 is bent to occupy a plane parallel to the band 46 whereas the lower ear 51 serves as the upper boundary of a notch 52 which receives and secures in place the grid on the lower housing 21 as later described. The edges of the lower end sections 44 are otherwise rounded to an oval form.

The upper end section 43 has two horizontally spaced holes 53 and 54 in the lower portion thereof, and the lower front edge of the upper section is curved on a radius having the hole 53 as the center. At the rear edge the curve straightens out to provide a stop at 55, directly below the hole 54. Contiguous to, above and at approximately right angles to the stop 55 is a slightly rounding cam surface 56 whose upper end forms an appreciable recess at 57 in conjunction with the remaining rear edge portion 58, which edge portion thereabove follows the oval contour of the lower end section over this area as shown in Fig. 2.

The link 42 is offset intermediate its ends to provide appropriate clearances and is pivotally connected at its upper end to the upper member by a pin 60. The pin is received in the opening 54 in the upper members and in the opening 61 at the upper end of the link. The lower end of the link has a second opening 62 which receives the shank of a pin 63 that in turn slides in the slot 47 with the head of the pin located on the opposite side of the slot from the link.

The upper and lower sections 43 and 44 are also slidably mounted with respect to each other by pins 64, the shank ends of which are received in the holes 53 on the upper member with the other ends extending through the slots 47 and terminating in heads disposed on the outside faces of the upper member. In the assembly shown in the first eleven figures the lower members 44 of the hinge are located on the outside of the upper members 43 and the links are disposed between the members. Only the heads of the pins 63 and 64 are seen in the side elevation. Preferably the link in its resting position (Fig. 2) is disposed at approximately a 45° angle from the center line of the slot 47. This provides maximum movement between the hinge members for all purposes.

In operation the hinge parts are shown in their normally closed position in Fig. 2. If the upper and lower housings 20 and 21 do not sooner engage and rest upon each other, it will be observed that the upper hinge member is limited in its downward movement by the pin 63 engaging the bottom of the slot 47 in which position the upper hinge member is held in a level position by the link 42 supporting one side and the shoulder 64 on the other side resting upon the stop 50.

From this position the hinges can be moved approximately 100° to the position shown in Fig. 3. During, and at the end of this movement, the pins 63 are fully weight bearing at the bottom of the slots 47. The top of the link 42 is carried forwardly by the forward movement of the pin 60 and the pin secured to the upper member slides and is toggled upwardly in the slot with the result that the upper hinge member is lifted as well as pivoted. This movement is continued until the stop 55 comes to rest against the ear 50 shortly after the center of the pin 60 passes across the center line of the slot 47, thereby providing a self-sustaining position.

In event the position of the two units are to be those shown in Fig. 4, the upper member 20 is lifted until the stops 55 clear the ears 50. Thereafter the hinge is free to move the remainder of a 180° total movement to occupy the position shown in Fig. 4 in which position the weight of the upper unit is borne by suitable support and the two pins 63 as spaced laterally along the back edge resting at the bottom of the slots 47 and their associated links 42. In this position both the upper and lower members are disposed side by side at the same level to serve as hot plates.

When returning the hinge elements to their original position, it will be noted that the notch 57 is located at approximately the same level as the top ear 50 in Fig. 4. As the upper hinge section 43 is lifted, the pin 64 moves upwardly, moving the notch 57 closer to the ear 50 while the link maintains them at the same level. When the pin 64 is approximately at the same level as the top of the ear 50, further movement brings the cam 56 into engagement with the top of the ear because the cam rise is greater than the distance of the pin 64 to the recess 57 and also greater than the distance from the slot 47 to the ear 50. Thereafter the cam serves as a sliding lever to carry the weight and lift the upper member 20 until the end of the cam slips off and behind the ear whereupon the position shown in Fig. 3 comes again into existence.

In those instances where grilling or broiling operation is desired the hinge has a sliding relationship as shown in Figs. 5 and 6. In each instance the whole hinge assembly merely slides vertically to the required height. However, it will be noticed that the pin 64 is well above the ear 50, sufficiently so that the stop 55 could clear the ear 50. If the stop did clear the ear the raised portion in Fig. 3 could not be attained. To prevent this the link 42 moves the pin 63 downwardly as the top member is raised. Thus as the top member approaches a vertical position the pin has moved downwardly until it reaches the bottom of the slot and locates the upper pin 64 where the stop 55 will engage the ear 50 as shown in Fig. 3 so that the initial 100° of movement is always under the control of and limited by the stop 55.

Consequently, to those skilled in the art it is apparent from the description and drawings how the objects and results are accomplished and how various and further constructions and arrangements can be made without departing from the spirit of the invention, the scope of which is commensurate with the appended claims.

What is claimed is:

1. In a device of the class described having an upper and lower housing, a hinge element secured to the lower housing having a vertical track with a stop at its lower end, a second hinge element secured to the upper housing and having a member supported on said track for movement therealong above said stop, a link pivoted at one end to said upper element at one side of said member and at the other end having a means supported on said track for bodily displacement therealong towards and away from said stop below said member and adapted to engage said stop in weight bearing relationship said link displacing said upper element upwardly as the hinge is opened.

2. In a device of the class described having an upper and lower housing, a hinge element secured to the lower housing having a vertical track with a stop at its lower end, a second hinge element secured to the upper housing and having a member riding on said track, a link pivoted at one end to said upper element at one side of said member and having a means supported and movable on said track below said member and adapted to engage said stop in weight bearing relationship, a protuberance on said upper hinge element below the point of pivotal securement of the link on one side of the track when the hinge is closed, and an ear on the lower hinge element on the other side of the track engaged by said protuberance when the hinge is open.

3. In a device of the class described having an upper and lower housing, a hinge element secured to the lower housing having a vertical track with a stop at its lower end, a second hinge element secured to the upper housing and having a member engaging and moving along on said track, a link pivoted at one end to said upper element at one side of said member and having a means engaging and moving along on said track below said member and adapted to engage said stop in weight bearing relationship, a protuberance on said upper hinge element at one side of the track when the hinge is closed below the point of pivotal securement of the link, and a stop ear on the lower hinge element on the other side of the track when the hinge is closed engaged by one side of the protuberance when the hinge is partially open, said protuberance having a lifter cam on the other side engaging the top of the stop ear when the hinge is moved from wide open to closed position.

4. The combination called for in claim 2 in which the ear is disposed parallel to said track, said protuberance being movable with respect to said ear in a direction parallel with the track into and out of engagement therewith.

References Cited in the file of this patent

UNITED STATES PATENTS

| | | |
|---|---|---|
| 814,288 | Hausfeld | Mar. 6, 1906 |
| 2,016,598 | Field | Oct. 8, 1935 |
| 2,167,489 | Renga | July 25, 1939 |
| 2,478,529 | Farr | Aug. 9, 1949 |